United States Patent Office 3,257,423
Patented June 21, 1966

3,257,423
ESTRATRIENE HYDRAZONE DERIVATIVES AND METHODS FOR THEIR MANUFACTURE
Cecil H. Robinson, Timonium, Md., and Lawrence E. Finckenor, Wayne, N.J., assignors to Schering Corporation, Bloomfield, N.J., a corporation of New Jersey
No Drawing. Filed July 23, 1964, Ser. No. 384,788
7 Claims. (Cl. 260—397.5)

This invention relates to a novel class of steroids, to methods for their manufacture, and to novel intermediates produced thereby. More particularly, this invention relates to therapeutically valuable steroids of the estrane series having a 17-substituted hydrazone function. Specifically, this invention relates to 3-hydroxy-1,3,5(10)-estratrienes having at C–17 a lower alkanoyl hydrazone function, including derivatives thereof, and methods for their preparation.

Included among the novel steroids of this invention are 17-substituted hydrazone derivatives of the following general Formula I:

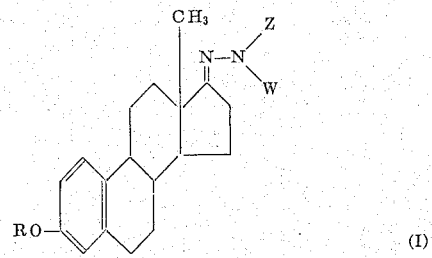

wherein R is a member selected from the group consisting of hydrogen, lower alkyl, and an acid radical of a hydrocarbon carboxylic acid having up to 8 carbon atoms; W is lower alkanoyl; and Z is a member selected from the group consisting of hydrogen and lower alkyl.

The lower alkanoyl substituents on the 17-hydrazone function contemplated in this invention are those having up to seven carbon atoms, e.g., formyl, acetyl, caproyl and the like.

By lower alkyl, is contemplated hydrocarbon radicals having up to 7 carbon atoms, thus, including radicals such as methyl, ethyl, propyl, t-butyl, hexyl, heptyl, and the like.

The esters at C–3 of the compounds of this invention are preferably from lower alkanoic acids such as acetic, propionic, butyric, valeric, caproic and enanthic acids and from unsaturated aliphatic acids such as tetrolic and acrylic acids. Also included are aryl radicals of aryl carboxylic acids such as benzoic and toluic acids, and of dibasic acids such as succinic and phthalic aids.

The above definition of the novel compounds of this invention should not be strictly construed, but rather should be considered to admit as equivalent compounds those having the presence of other substituents on the steroid nucleus, particularly at positions 1, 6, 9, 11, and 16 such as the 1-methyl, 6α-methyl, 6α-fluoro, 6α-chloro, 9α,11β-dichloro, 16α-methyl, 16β-methyl, and 16α-acyloxy analogs thereof. This modification depends solely on the choice of starting material employed, which in the present instance would involve the employment of a 17-keto-1,3,5(10)-estratriene possessing the desired substituent in the positions indicated, which substituents are introduced by methods known in the art.

In addition, considered as equivalents of the above defined estratrienes (I) wherein W is lower alkanoyl, are those compounds defined by Formula I when W is benzoyl or cyanoacetyl, i.e. 3β-OR-1,3,5(10)-estratriene-17-one 17-benzoylhydrazones and 3β-OR-1,3,5(10)-estratriene-17-one 17-cyanoacetylhydrazones wherein R is as above defined.

Included in this invention are compounds such as
3-methoxy-1,3,5(10)-estratriene-17-one 17-acetylhydrazone;
3-methoxy-1,3,5(10)-estratriene-17-one 17-cyclopropyl-carboxoylhydrazone;
3-methoxy-1,3,5(10)-estratriene-17-one 17-formylhydrazone;
3-methoxy-1,3,5(10)-estratriene-17-one 17-cyanoacetyl-hydrazone;
3-hydroxy-1,3,5(10)-estratriene-17-one 17-acetylhydrazone;
3-methoxy-1,3,5(10)-estratriene-17-one 17-benzoylhydrazone;
3-methoxy-1,3,5(10)-estratriene-17-one 17-N-methyl-N-acetylhydrazone; and
3-acetoxy-1,3,5(10)-estratriene-17-one 17-N-methyl-N-caproylhydrazone.

The preferred compounds of this invention are 17-mono-lower alkanoylhydrazone derivatives wherein Z is hydrogen such as the 17-formylhydrazone and the 17-acetylhydrazone of 3-methoxy-1,3,5(10-estratriene-17-one.

The compounds of this invention e.g. those defined by Formula I and equivalents thereof such as 3-methoxy-1,3,5(10)-estratriene-17-one 17-benzoylhydrazone and 3-methoxy-1,3,5(10)-estratriene-17-one 17-cyanoacetylhydrazone possess estrogenic activity. They are preferably administered subcutaneously either in solution or in suspension with pharmaceutically acceptable carriers such as those used in pharmaceutical formulations of known estrogens. The estrone 17-substituted hydrazones of this invention may also be administered orally such as in tablets in admixture with a pharmaceutically acceptable excipient. The dosage of 1,3,5(10)-estratriene-17-substituted hydrazone used will vary depending on the nature and severity of the symptom being treated.

The estrone 17-lower alkanoyl hydrazones of our invention are conveniently prepared by treating a 17-keto-1,3,5(10)-estratriene with a lower alkanoyl hydrazine in methanol/acetic acid, for example, or in an inert solvent such as tetrahydrofuran, to obtain directly the corresponding 17-substituted hydrazone derivative. Thus, estrone methyl ether (i.e., 3-methoxy-1,3,5(10)-estratriene-17-one) upon treatment with approximately a molar equivalent of monoacetylhydrazine in methanol, to which a catalytic amount of glacial acetic acid has been added, will yield estrone methyl ether 17-acetylhydrazone (i.e., 3 - methoxy - 1,3,5(10) - estratriene - 17 - one 17 - acetylhydrazone).

The estrone 17-substituted hydrazones are also prepared via a two-step synthesis whereby the 17-unsubstituted hydrazone function is first introduced such as by reaction of the 17-keto-1,3,5(10)-estratriene starting compound with aqueous hydrazine in ethanol and triethylamine according to known procedures, or by reaction of the 17-keto-1,3,5(10)-estratriene with potassium azodicarboxylate in acetic acid and methanol. The 1,3,5(10)-estratriene 17-unsubstituted hydrazone derivative thereby produced upon treatment with an acid anhydride, e.g., acetic or propionic anhydride in pyridine is converted to the corresponding 1,3,5(10)-estratriene 17-acylhydrazone derivative, e.g., 17-acetylhydrazone and 17-propionylhydrazone. For example, estrone methyl ether (1,3,5(10)-estratriene-3-ol-17-one-3-methyl ether), upon treatment with 65% aqueous hydrazine in ethanol and triethylamine in known manner is converted to the corresponding 17-hydrazone, i.e., estrone 3-methyl ether 17-hydrazone. Treatment of the foregoing with approximately a molar equivalent of acid anhydride, e.g., propionic anhydride, in pyridine, will yield the corresponding 17-propionylhydrazone derivative, i.e., estrone 3-methyl ether 17-propionylhydrazone.

The 17-N-alkyl-N-acylhydrazone-1,3,5(10)-estratrienes of this invention are conveniently prepared from the corresponding 17-keto-estratrienes by first introducing a nonoalkylhydrazone at C–17 by reaction with a monoalkyl hydrazine according to known methods, followed by treatment of the thereby produced 17-monoalkylhydrazone-1,3,5(10)-estratriene with an acid anhydride either alone or in pyridine to obtain the corresponding N-alkyl-N-acylhydrazone. Thus, for example, estrone methyl ether (3-methoxy-1,3,5(10) - estratriene - 17 - one), upon treatment with methylhydrazine according to known procedures is converted to estrone 3-methyl ether 17-N-methylhydrazone which upon treatment with acetic anhydride in pyridine yields the 17-disubstituted hydrazone, i.e., estrone 3-methyl ether 17-N-methyl-N-acetylhydrazone. Treatment with other lower alkanoic acid anhydrides, such as caproic acid anhydride, will yield the corresponding N-methyl-N-acyl derivative, e.g., estrone 3-methyl ether 17-N-methyl-N-caproylhydrazone.

When preparing the 17-N-alkyl-N-acylhydrazones of this invention, or when employing the aforedescribed two-step synthesis for the preparation of 17-monoacylhydrazones, any free hydroxyl group present at C–3 of the starting compound will be esterified during the step involving treatment with a lower alkanoic acid anhydride. Thus, estrone upon reaction with monomethylhydrazine or hydrazine in known manner yields estrone 17-methylhydrazone and estrone 17-hydrazone, respectively. Treatment of each of the foregoing with propionic anhydride in pyridine, for example, yields the 3-propionic acid esters, i.e., estrone 3-propionate 17-N-methyl-N-propionylhydrazone, and estrone 3-propionate 17-propionylhydrazone, respectively. If desired, one can then hydrolyze the ester function at C–3 by dilute (e.g., 1%) methanolic potassium hydroxide at room temperature, for example.

The 17-keto-1,3,5(10)-estratriene starting compounds of the processes of this invention are known—such as estrone, estrone acetate, estrone methyl ether, and the like.

Of the monoacylhydrazine reagents utilized in preparing our novel compounds, many are known, such as acetylhydrazine, benzoylhydrazine, formylhydrazine, cyanoacetylhydrazine, and the like. If a desired monoacylhydrazone is not available, it can be conveniently prepared utilizing known procedures, i.e., by treating anhydrous (i.e., 95%) hydrazine with a lower carboxylic acid ester, e.g., ethyl acetate, at about 100° C. to obtain the corresponding lower carboxoyl hydrazine (e.g., acetylhydrazine).

Similarly, many of the monoalkylhydrazine intermediates are known, such as monomethylhydrazine and monoethylhydrazine. If not available, a monoalkylhydrazine is conveniently prepared in known manner by treating a substituted urea with hypohalite or by treating an appropriate alkylamine with chloroamine prepared in situ from sodium hypochlorite and ammonium hydroxide.

The following examples are for illustrative purposes only and are not to be construed as limiting, the limit of our invention being defined by the appended claims.

*Example 1.—3-methoxy-1,3,5(10)-estratriene-17-one 17-acetylhydrazone*

To a suspension of 1 g. of 3-methoxy-1,3,5(10)-estratriene-17-one in 20 ml. of methanol and 0.8 ml. of glacial acetic acid, add 1.2 g. of monoacetylhydrazine. Heat this mixture at reflux temperature for one-half hour; then cool to 0.5° C. Filter the resultant precipitate comprising 3-methoxy-1,3,5(10)-estratriene-17-one 17 - acetylhydrazone. Purify by crystallization from aqueous methanol. M.P. 238–240° C. [α]$_D$ +95.4 (dioxane).

*Example 2.—3-methoxy-1,3,5(10)-estratriene-17-one 17-cyclopropylcarboxoylhydrazone*

To 1 g. of 3-methoxy-1,3,5(10)-estratriene-17-one in 40 ml. of methanol and 0.8 ml. of glacial acetic acid, add 2 g. of cyclopropylcarboxoylhydrazine. Heat the mixture at reflux temperature for one-half hour. Pour the reaction mixture into 400 ml. of water; then filter and dry the resultant precipitate comprising 3-methoxy-1,3,5(10)-estratriene-17-one 17 - cyclopropylcarboxoylhydrazone. Purify by crystallization from methylene chloride/methanol. M.P. 275–282° C.

*Example 3.—3-methoxy-1,3,5(10)-estratriene-17-one 17-formylhydrazone*

Heat at reflux temperature for two hours a mixture of 1 g. of 3-methoxy-1,3,5(10)-estratriene-17-one and 2 g. of formylhydrazine in 40 ml. of methanol and 0.8 ml. of glacial acetic acid. Pour the reaction mixture into 400 ml. of water; then filter the resultant precipitate comprising 3-methoxy-1,3,5(10)-estratriene - 17 - one 17-formylhydrazone. Purify by crystallization from methylene chloride/hexane. M.P. 244–246° C. [α]$_D$ +86.5 (dioxane).

Alternatively, the compound of this example is prepared by refluxing for one-half hour a mixture of 1 g. of 3-methoxy-1,3,5(10)-estratriene-17-one and 2 g. of formylhydrazine in 20 ml. of tetrahydrofuran. After cooling, the reaction mixture is filtered and purified in a manner similar to that described above.

*Example 4.—3-methoxy-1,3,5(10)-estratriene-17-one 17-cyanoacetylhydrazone*

To 1 g. of 3-methoxy-1,3,5(10)-estratriene-17-one in 20 ml. of methanol and 0.8 ml. of glacial acetic acid, add 2 g. of cyanoacetylhydrazine. Heat this suspension at reflux temperature for two hours; then pour the reaction mixture into 200 ml. of water. Filter and dry the resultant precipitate comprising 3-methoxy-1,3,5(10)-estratriene-17-one 17-cyanoacetylhydrazone. Purify by crystallization from methylene chloride/methanol. M.P. 265–268° C. [α]$_D$ +71.8 (pyridine).

*Example 5.—17-acetylhydrazones of 1,3,5(10)-estratriene-3-ol-17-one and 3-acyloxy derivatives thereof*

In a manner similar to that described in Example 1, treat a solution of estrone (1,3,5(10)-estratriene-3-ol-17-one) in methanol and glacial acetic acid with monoacetylhydrazine. Isolate the resultant compound in a manner similar to that described in Example 1 to obtain 1,3,5(10)-estratriene-3-ol-17-one 17-acetylhydrazone.

Similarly, the following compounds may be treated with monoacetylhydrazine in methanol and glacial acetic acid:

3-acetoxy-1,3,5(10)-estratriene-17-one;
3-valeroxy-1,3,5(10)-estratriene-17-one;
3-caprooxy-1,3,5(10)-estratriene-17-one;
1-methyl-3-acetoxy-1,3,5(10)-estratriene-17-one; and
3-benzoyloxy-1,3,5(10)-estratriene-17-one;

and there will be obtained the following 17-acetylhydrazone derivatives:

3-acetoxy-1,3,5(10)-estratriene-17-one 17-acetylhydrazone;
3-valeroxy-1,3,5(10)-estratriene-17-one 17-acetylhydrazone;
3-caprooxy-1,3,5(10)-estratriene-17-one 17-acetylhydrazone;
1-methyl-3-acetoxy-1,3,5(10)-estratriene-17-one 17-acetylhydrazone; and
3-benzoyloxy-1,3,5(10)-estratriene-17-one 17-acetylhydrazone.

*Example 6.—1,3,5(10)-estratriene-3-ol-17-one 17-hydrazone*

Procedure A.—To a solution of 1 g. of 1,3,5(10)-estratriene-3-ol-17-one in 10 ml. of ethanol, add 2 ml. of triethylamine and 6 ml. of 65% aqueous hydrazine. Reflux the reaction mixture for 2 hours; cool; pour into 200 ml. of water; then filter and dry the resultant precipitate comprising 1,3,5(10)-estratriene-3-ol-17-one 17-hydrazone.

Purify by crystallization from methylene chloride/isopropyl ether.

*Procedure B.*—The compound of this example is also prepared as follows:

To a solution of 1 g. of 1,3,5(10)-estratriene-3-ol-17-one in 20 ml. of methanol and 3.5 ml. of acetic acid, add with stirring over a fifteen minute period 3 g. of potassium azodicarboxylate. Stir the reaction mixture at room temperature for two hours; then pour into 200 ml. of water and filter and dry the resultant precipitate comprising 1,3,5(10)-estratriene-3-ol-17-one 17-hydrazone. Purify by crystallization from methylene chloride/isopropyl ether.

In a similar manner, react each of 3-acetoxy-1,3,5(10)-estratriene-17-one and 3-benzoyloxy-1,3,5(10)-estratriene-17-one with potassium azodicarboxylate according to the above procedure. Isolate and purify the resultant products in the manner described to give, respectively, 3-acetoxy-1,3,5(10)-estratriene-17-one 17-hydrazone and 3-benzoyloxy-1,3,5(10)-estratriene-17-one 17-hydrazone.

*Example 7.—1,3,5(10)-estratriene-3-ol-17-one 3-propionate 17-propionylhydrazone*

Dissolve 1 g. of 1,3,5(10)-estratriene-3-ol-17-one 17-hydrazone in 10 ml. of pyridine and 1 ml. of propionic anhydride and allow the solution to stand at room temperature for 18 hours. Pour the reaction mixture into 100 ml. of water and filter and dry the resultant precipitate comprising 1,3,5(10)-estratriene-3-ol-17-one 3 propionate 17-propionylhydrazone. Purify by crystallization from methylene chloride/hexane.

In a similar manner, react each of 3-acetoxy-1,3,5(10)-estratriene-17-one 17-hydrazone, and 3-benzoyloxy-1,3,5-(10)-estratriene-17-one 17-hydrazone, with propionic anhydride/pyridine and isolate and purify the resultant products in the above-described manner to obtain, respectively, 3-acetoxy-1,3,5(10)-estratriene-17-one 17-propionylhydrazone, and 3-benzoyloxy-1,3,5(10)-estratriene-17-one 17-propionylhydrazone.

*Example 8.—3-methoxy-1,3,5(10)-estratriene-17-one 17-benzoylhydrazone*

To 1 g. of 3-methoxy-1,3,5(10)-estratriene-17-one in 40 ml. of methanol, add 0.8 ml. of acetic acid and 2 g. of benzoylhydrazine. Heat this mixture at reflux temperature for one-half hour; then dilute the mixture with 80 ml. of water. Cool the reaction mixture; then filter and dry the resultant precipitate comprising 3-methoxy-1,3,5-(10)-estratriene-17-one 17-benzoylhydrazone. Purify by crystallization from methanol.

In a similar manner, react each of 1,3,5(10)-estratriene-3-ol-17-one, 3-acetoxy-1,3,5(10)-estratriene-17-one and 3-benzoyloxy-1,3,5(10)-estratriene-17-one with benzoylhydrazine in methanol and acetic acid. Isolate and purify the resultant products in the manner described above to give, respectively, 1,3,5(10)-estratriene-3-ol-17-one 17-benzoylhydrazone, 3-acetoxy-1,3,5(10)-estratriene-17-one 17-benzoylhydrazone, and 3-benzoyloxy-1,3,5(10)-estratriene-17-one 17-benzoylhydrazone.

*Example 9.—3-methoxy-1,3,5(10)-estratriene-17-one 17-N-methyl-N-acetylhydrazone*

A. *3 - methoxy - 1,3,5(10) - estratriene - 17 - one 17-methylhydrazone.*—Add 1 g. of 3-methoxy-1,3,5(10)-estratriene-17-one to 10 ml. of methylhydrazine and reflux the mixture for 17 hours. Cool the reaction mixture; then pour into water and filter and air-dry the resultant precipitate comprising 3-methoxy-1,3,5(10)-estratriene-17-one 17-methylhydrazone. Purify by crystallization from acetone-hexane.

In the above procedure, by substituting ethylhydrazine in place of methylhydrazine, there is obtained 3-methoxy-1,3,5(10)-estratriene-17-one 17-ethylhydrazone.

B. *3-methoxy-1,3,5(10)-estratriene-17-one 17-N-methyl - N - acetyl - hydrazone.*—Dissolve 1 g. of 3-methoxy-1,3,5(10)-estratriene-17-one 17-methylhydrazone in 10 ml. of pyridine and 1 ml. of acetic anhydride. Allow the solution to stand at room temperature for 18 hours; then add 1 ml. of water and pour into 100 ml. of water. Filter the resultant precipitate comprising 3-methoxy-1,3,5(10)-estratriene - 17 - one 17 - N - methyl - N - acetylhydrazone. Purify by crystallization from acetone-hexane.

In a similar manner, react 3-methoxy-1,3,5(10)-estratriene-17-one 17-ethylhydrazone with acetic anhydride in pyridine and isolate and purify the resultant product to obtain 3-methoxy-1,3,5(10)-estratriene - 17 - one 17-N-ethyl-N-acetylhydrazone.

In the procedure outlined in the first paragraph of this example, if other lower alkanoic acid anhydrides such as propionic acid anhydride, caproic acid anhydride and valeric acid anhydride are substituted for acetic acid anhydride, there is obtained the following corresponding lower alkanoyl hydrazones: 3-methoxy-1,3,5(10)-estratriene-17-one 17-N-methyl-N-propionylhydrazone, 3-methoxy-1,3,5(10)-estratriene-17-one 17 - N - methyl-N-caproylhydrazone, and 3-methoxy-1,3,5(10)-estratriene-17-one 17-N-methyl-N-valerylhydrazone.

*Example 10.—3-acetoxy-1,3,5(10)-estratriene-17-one 17-N-methyl-N-acetylhydrazone*

A. *1,3,5(10) - estratriene - 3 - ol - 17 - one 17 - methylhydrazone.*—In a manner similar to that described in Example 9A, allow 1 g. of 1,3,5(10)-estratriene-3-ol-17-one to react with 10 ml. of methylhydrazine; then isolate and purify the resultant product in the described manner to obtain 1,3,5(10)-estratriene-3-ol-17-one 17-methylhydrazone.

B. *3 - acetoxy - 1,3,5(10) - estratriene - 17 - one 17-N-methyl-N-acetylhydrazone.*—In a manner similar to that described in Example 9B, allow 1,3,5(10)-estratriene-3-ol-17-one 17-methylhydrazone to react with acetic anhydride in pyridine. Isolate and purify the resultant product in the described manner to obtain 3-acetoxy-1,3,5(10)-estratriene-17-one 17-N-methyl-N-acetylhydrazone.

In the above procedure by substituting caproic acid anhydride for acetic acid anhydride, there is obtained 3-caprooxy-1,3,5(10)-estratriene-17-one 17 - N - methyl-N-caproylhydrazone.

We claim:

1. A compound of the following structural formula:

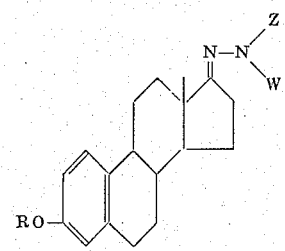

wherein R is a member selected from the group consisting of hydrogen, lower alkyl, and an acid radical of a hydrocarbon carboxylic acid having up to 8 carbon atoms; W is lower alkanoyl; and Z is a member selected from the group consisting of hydrogen and lower alkyl.

2. The compound of claim 1 wherein R is methyl, W is acetyl, and Z is hydrogen; said compound having the name 3 - methoxy - 1,3,5(10) - estratriene - 17 - one 17-acetylhydrazone.

3. The compound of claim 1 wherein R is methyl, W is formyl, and Z is hydrogen; said compound having the name 3 - methoxy - 1,3,5(10) - estratriene - 17 - one 17-formylhydrazone.

4. The compound of claim 1 wherein R is methyl, W is cyanoacetyl, and Z is hydrogen; said compound having the name 3-methoxy-1,3,5(10)-estratriene-17-one 17-cyanoacetylhydrazone.

5. The compound of claim 1 wherein R is methyl, W is cyclopropylcarboxoyl, and Z is hydrogen; said compound having the name 3-methoxy-1,3,5(10)-estratriene-17-one 17-cyclopropylcarboxoylhydrazone.

6. The compound of claim 1 wherein R is methyl, W is lower alkanoyl, and Z is hydrogen; said compound having the name 3-methoxy-1,3,5(10)-estratriene-17-one 17-lower alkanoylhydrazone.

7. In the process of preparing 3-OR-1,3,5(10)-estratriene-17-one 17-lower alkanoylhydrazone wherein R is a member selected from the group consisting of hydrogen, lower alkyl, and an acid radical of a hydrocarbon carboxylic acid having up to 8 carbon atoms; the steps which comprise reacting 3 - OR - 1,3,5(10)-estratriene-17-one wherein R is as hereinabove defined, with potassium azodicarboxylate; and treating the thereby formed corresponding 17-hydrazone derivative with a lower alkanoic acid anhydride.

References Cited by the Examiner
UNITED STATES PATENTS 3,032,469  5/1962  Gleason _____ 167—65

OTHER REFERENCES

Sidgwick, Organic Chemistry of Nitrogen, Oxford University Press, London, pages 398–399 (1937).

LEWIS GOTTS, *Primary Examiner.*

H. A. FRENCH, *Assistant Examiner.*